(12) United States Patent
Welke et al.

(10) Patent No.: US 7,479,725 B2
(45) Date of Patent: Jan. 20, 2009

(54) STATOR FOR AN ELECTRIC MACHINE

(75) Inventors: Knut Welke, Falkensee/Waldheim (DE); Manfred Zimmer, Zeil (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 275 days.

(21) Appl. No.: 11/585,593

(22) Filed: Oct. 24, 2006

(65) Prior Publication Data
US 2007/0096583 A1   May 3, 2007

(30) Foreign Application Priority Data
Oct. 25, 2005   (DE) ........................ 10 2005 050 987

(51) Int. Cl.
*H02K 3/46* (2006.01)
(52) U.S. Cl. ........................ 310/260; 310/71
(58) Field of Classification Search ................. 310/71, 310/194, 259, 260, 179
See application file for complete search history.

(56) References Cited

U.S. PATENT DOCUMENTS

| 4,322,647 | A * | 3/1982 | Neroda et al. ................. 310/71 |
| 5,895,994 | A * | 4/1999 | Molnar et al. ............... 310/215 |
| 6,541,888 | B2 | 4/2003 | van Heyden et al. |
| 6,600,244 | B2 | 7/2003 | Okazaki et al. |
| 6,737,772 | B2 * | 5/2004 | Tanaka et al. ................. 310/71 |
| 7,116,023 | B2 * | 10/2006 | Wang et al. .................... 310/71 |
| 7,382,075 | B2 * | 6/2008 | Wang et al. ................. 310/194 |
| 7,414,347 | B2 * | 8/2008 | Wang et al. ................. 310/260 |
| 2007/0046129 | A1 * | 3/2007 | Suginobu .................... 310/216 |
| 2007/0170792 | A1 * | 7/2007 | Bott et al. ...................... 310/71 |

FOREIGN PATENT DOCUMENTS

DE    198 50 818    5/2000

OTHER PUBLICATIONS

Schreyer, G., Konstruieren mit Kunststoffen; Grundlagen und Eigenschaften, Konstruktionsprinzipien und Anwendungsbeispiele; ISBN: 3-446-11473-4; Carl Hanser Verlag München 1972.

* cited by examiner

*Primary Examiner*—Thanh Lam
(74) *Attorney, Agent, or Firm*—Cohen Pontani Lieberman & Pavane LLP

(57) ABSTRACT

The stator for an electric machine includes a ring-shaped stator yoke, on which stator coils, formed on winding bodies and distributed uniformly around the circumference, are mounted. The coils are wired electrically together by a wiring arrangement, which has a ring-shaped carrier element designed to be attached to the stator to hold connecting conductors. The carrier element is mounted radially with respect to the winding elements. To ensure a simple and reliable mounting of the carrier element on the stator, it is proposed that the carrier element be held in place on the winding bodies by means of a latching connection so that it cannot move in the axial direction.

8 Claims, 1 Drawing Sheet

STATOR FOR AN ELECTRIC MACHINE

BACKGROUND OF THE INVENTION

The invention pertains to a stator for an electric machine. In particular, the invention pertains to the arrangement of a ring-shaped carrier element which holds the electrical connecting conductors used to wire the stator together and thus forms part of the arrangement for wiring the individual stator coils.

Known stators for electric machines have a stator yoke with a certain number of stator teeth, which carry the electrical winding in the form of, for example, individual stator coils formed out of insulated wire. The two ends of each coil are assigned to individual phases, and the coils are wired together in a predetermined manner by means of a wiring arrangement, which includes common connecting conductors. In the case of a 3-phase machine, the stator has three phases and thus at least three connecting conductors, which are supplied with current at a phase offset of 120° from each other. The connecting conductors are connected to a switch box, so that the electric machine can be connected to a power source. The connecting conductors can, for example, be positioned in a receiving space formed as an integral part of the winding bodies and thus held in place on the stator. A winding body suitable for this purpose is described in, for example, U.S. Pat. No. 6,541,888. In this variant, the individual prefabricated coils are first mounted on the stator yoke, and then the connecting conductors are laid in the receiving space, which extends segment by segment through the set of winding bodies, and connected to the ends of the coils.

There is also the alternative possibility, however, of pre-mounting the connecting conductors in a carrier element separate from the winding bodies and of mounting this carrier element as a prefabricated unit on the stator. For this purpose, U.S. Pat. No. 6,600,244 discloses a stator designed in such a way that the carrier element which holds the electrical connecting conductors is mounted axially next to the stator coils. The carrier element can have axially projecting fastening claws, which engage in openings in the winding bodies. The openings are introduced into an area of the end surface of the winding bodies which projects axially over the coil winding.

It is felt to be a disadvantage of the arrangement described above that the winding bodies must be extended axially from the stator to create an area in which the openings can be formed. As a result, the electric machine as a whole becomes unnecessarily large in the axial direction.

A stator of the type indicated above is described in DE 198 50 818 A1, in which the connecting conductors are located in a carrier element mounted radially on the winding bodies of the stator coils. The document gives no indication, however, of how the carrier element is held in position there.

SUMMARY OF THE INVENTION

It is an object of the present invention to propose a stator of the previously described type for which, in particular, a ring-shaped carrier element belonging to the stator's wiring arrangement is provided to guide the electrical connecting conductors, this carrier element being both easily installed and reliably held in place on the stator.

According to a preferred embodiment, a stator for an electric machine which has a ring-shaped stator yoke, on which stator coils, wound around winding bodies and distributed uniformly around the circumference, are mounted. These stator coils are wired together by means of a wiring arrangement. To hold the connecting conductors, which are arranged radially with respect to the winding bodies, the wiring arrangement has a ring-shaped carrier element, which is designed to be attached to the stator. The carrier element is held in place on the winding bodies by means of a latching connection so that it cannot move in the axial direction. The latching connection ensures both an operationally reliable attachment and the possibility of rapid installation and removal of the carrier element. The carrier element can be easily pushed radially over the winding bodies in the axial direction or pushed into the interior space defined by the winding bodies and latched axially in place and in the circumferential direction on the winding bodies. The connecting conductors can be inserted into the carrier element and encapsulated with a suitable casting material before the carrier element is mounted on the stator. After the stator and carrier element have been attached to each other, the electrical connections between the ends of the coils and the connecting conductors laid in the carrier element can be made in the known manner.

In an especially advantageous embodiment of the invention, the latching elements formed on the carrier element engage in the intermediate spaces between adjacent winding bodies on the stator. The winding body can be designed as described in U.S. Pat. No. 6,541,888, for example. It thus has a winding support, which extends radially from the stator yoke, and two sidepieces, which are connected to the winding support and form the axial boundaries of the winding area. The latching elements of the carrier element can thus engage at both circumferential ends of the adjacent, radially inner or radially outer sidepieces or grip them at least partially from behind to form the latching connection.

The latching elements of the carrier element may be formed by a first set of radial projections, each of which cooperates with two opposing latching elements of adjacent winding bodies. Spring tongues are suitable for this purpose. They can be formed, for example, on the sidepieces of the winding bodies and arranged to point toward each other. The first radial projections are guided axially between these tongues while the carrier element is being pushed into position. The spring tongues are thus pushed apart, which increases the size of the space between them. When the carrier element reaches its final position, the load on the spring tongues is released. In this position, the first radial projections can now grip the winding bodies or, more precisely, their spring tongues, from behind to secure the carrier element in the axial direction. One of the end surfaces of the carrier element thus rests simultaneously against the stator yoke, so that, as a result of this design, the carrier element can be held in a defined position in both the axial and circumferential directions.

According to another embodiment of the invention, it is favorable for the carrier element to have a second set of radial projections, which engage in the intermediate spaces between adjacent winding bodies and which are supported there at least against one of the winding bodies axially and possibly also circumferentially. As a result, the carrier element can be held in place in an axially defined manner independently of its contact with the stator yoke. Furthermore, the second radial projections can also engage in corresponding openings in the end surface of the winding bodies facing away from the stator yoke.

The first and second radial projections are preferably axially offset from each other on the carrier element. The carrier element is also preferably made of plastic.

Other objects and features of the present invention will become apparent from the following detailed description considered in conjunction with the accompanying drawings.

It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:
The invention is explained by way of example below on the basis of the attached drawing.

DETAILED DESCRIPTION OF THE PRESENTLY PREFERRED EMBODIMENTS

Figure 1:
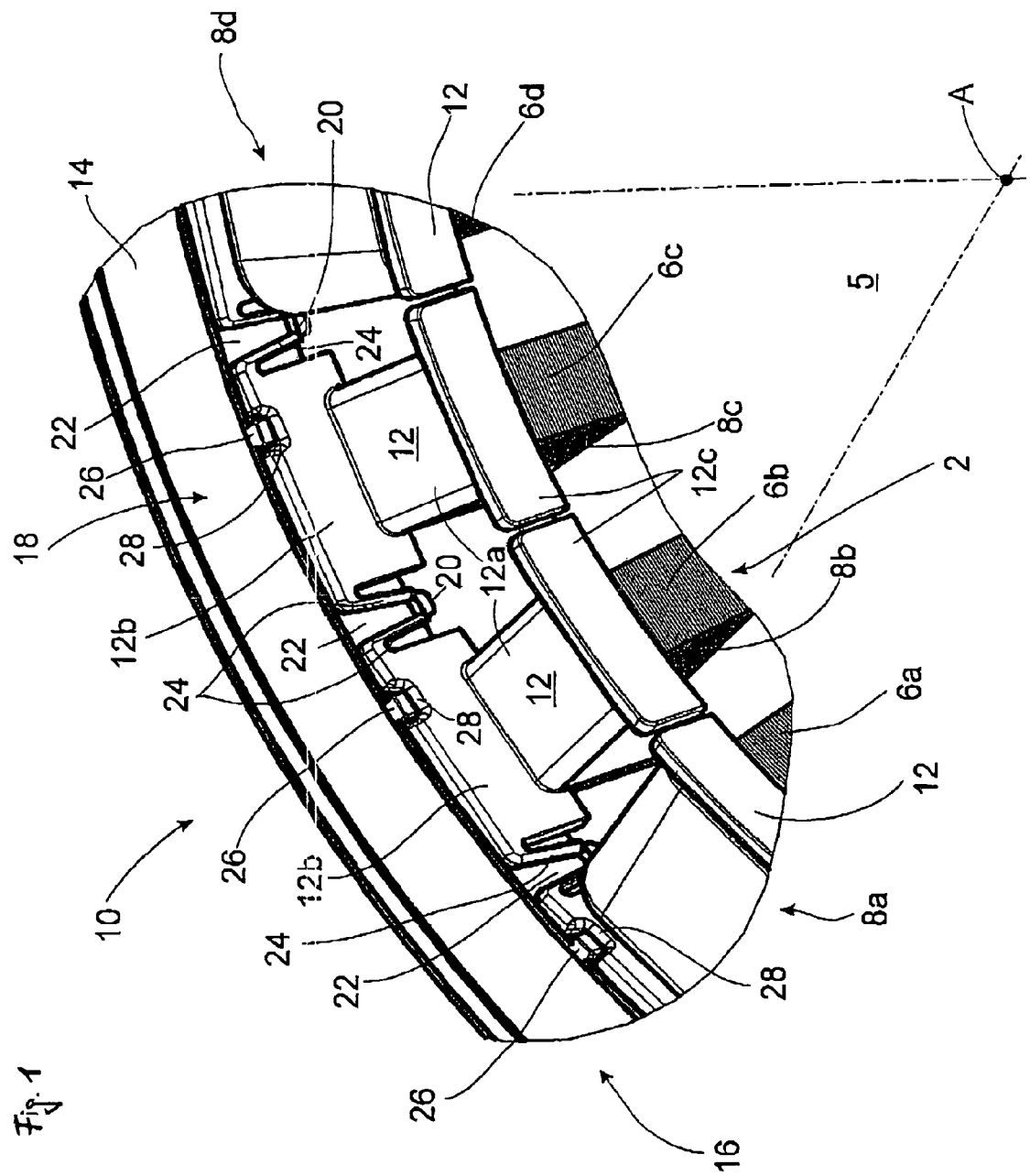
FIG. 1 is a schematic perspective view of a part of a stator according to the present invention.

FIG. 1 is a schematic view, in perspective, looking in the direction proceeding radially outward from a radially inner position, of part of a stator 10 for an electric machine, the rest not being shown, with a ring-shaped stator yoke 2 consisting of a lamination pack of electrical steel sheet, which is covered for the most part by additional elements of the stator 10, as will be explained below. The stator 10 in question here is a synchronous electric machine of the internal rotor type, excited by permanent magnets, where the stator 10 shown has a cylindrical interior space 5, in which a rotor can be accommodated. In the known manner, the stator yoke 2 has a number of radially inward-pointing teeth 6a-d, distributed uniformly around the circumference, which carry the individual coils 8a-d. The coils 8a-d are wound separately in a preceding production step with the help of two winding bodies 12, consisting of insulating material, and then pushed over the teeth 6a-d of the stator yoke 2 and secured in place there by means of a known latching connection (not shown) to prevent them from slipping.

The winding bodies 12 correspond in their basic design to the winding bodies described in U.S. Pat. No. 6,541,888. Each has a winding support 12a, extending radially from the stator yoke 2, and two sidepieces 12b and 12c, which are connected to the winding support 12a and form the axial boundaries of the winding area.

The coils 8a-d comprise a winding of an electric conductor. The ends of these windings or coils, which are not visible in the figure, are connected electrically in the known manner to three or even more electrical connecting conductors 14. For the sake of clarity, only the coils 8a and 8d are indicated in the drawing.

The connecting conductors 14 are executed as strip conductors of copper, for example, bent into rings, and they are connected in a predetermined manner to ends of the coils and to the terminals of a power supply device, which does not, however, form an object of the present invention.

The connecting conductors 14 are arranged inside a receiving space 18 of a carrier element 16, mounted on the stator 10. This carrier element is executed as a separate plastic ring, that is, as a ring independent of the winding bodies, with a receiving space 18 forming a groove open on one side.

The carrier element 16 is pushed axially onto the circumferential surface defined collectively by the radially outer sidepieces 12b of the winding bodies 12. The end surface of the element which faces away rests against the stator yoke 2, and, as will be explained below, the element is held in place on the winding bodies 12 by means of a latching connection so that it cannot move in the axial direction.

The end surface of the carrier element 16 facing the stator yoke 2 has a first set of radial projections 20, which act as latching elements, which engage in the intermediate gaps 22 between adjacent winding bodies 12 on the stator 10. For this purpose, spring tongues 24 are formed on the ends of the sidepieces 12b of the winding bodies 12 which support the carrier element 16, that is, on the ends of the sidepieces which face in the circumferential direction relative to the stator 10. The spring tongues which are directly opposite each other point toward each other. The first radial projections 20 are guided axially between each of these pairs of tongues as the carrier element 16 is being pushed into place. As this happens, the spring tongues 24 are pushed toward their winding bodies 12, the intermediate gaps 22 between them thus expanding, and then snap back into their original positions again after the first radial projections 20 have passed beyond them. In this position, the first radial projections 20 then grip behind the winding bodies 12 or, more precisely, their spring tongues 24, from behind and thus hold the carrier element on the stator yoke 2 so that it is secured in the axial direction.

In addition to the first set of radial projections 20, the carrier element 16 also has a second set of radial projections 26 on the end surface facing away from the stator yoke 2. These second projections are axially and circumferentially offset from the first set, engage in openings 28 in the end surface of the winding bodies 12 facing away from the stator yoke 2, and are supported axially there against the winding bodies 12. Of course, the second axial projections 26 can also have circumferential positions identical to those of the first axial projections 20 and thus also engage in the intermediate gaps 22 between two adjacent winding bodies and be supported axially and circumferentially at least against one of the adjacent winding bodies 12.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:
1. A stator for an electric machine, comprising:
a ring-shaped stator yoke extending in a circumferential direction;
stator coils formed on winding bodies and mounted to the stator yoke, the stator coils being distributed uniformly in the circumferential direction; and
a wiring arrangement connecting the stator coils electrically together, the wiring arrangement having a ring-shaped carrier element, designed to be attached to the stator, to hold connecting conductors, the carrier element being installed radially with respect to the winding bodies and being held in place on the winding bodies by a latching connection preventing relative movement in an axial direction.

2. The stator of claim 1, wherein the latching elements formed on the carrier element engage in intermediate gaps between adjacent winding bodies on the stator.

3. The stator of claim 1, wherein the latching elements of the carrier element include a first set of radial projections, each of which cooperates with two opposing latching elements on adjacent winding bodies.

4. The stator of claim 3, wherein the carrier element has a second set of radial projections, which engage in intermediate gaps between adjacent winding bodies and are supported axially there at least against one of the winding bodies.

5. The stator of claim 3, wherein the carrier element has a second set of radial projections which engage in openings in an end surface of the winding bodies facing away from the stator yoke.

6. The stator of claim 4, wherein the first and the second sets of radial projections are axially offset from each other on the carrier element.

7. The stator of claim 5, wherein the first and the second sets of radial projections are axially offset from each other on the carrier element.

8. The stator of claim 1, wherein the carrier element is made of plastic.

* * * * *